United States Patent
Xu et al.

(10) Patent No.: US 10,630,363 B2
(45) Date of Patent: Apr. 21, 2020

(54) ELECTRONIC DEVICE IN WIRELESS COMMUNICATION SYSTEM, AND WIRELESS COMMUNICATION METHOD

(71) Applicant: SONY CORPORATION, Tokyo (JP)

(72) Inventors: Jin Xu, Beijing (CN); Cheng Gao, Beijing (CN); Siqi Liu, Beijing (CN); Bingcheng Jin, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/760,941

(22) PCT Filed: Sep. 20, 2016

(86) PCT No.: PCT/CN2016/099452
§ 371 (c)(1),
(2) Date: Mar. 16, 2018

(87) PCT Pub. No.: WO2017/050210
PCT Pub. Date: Mar. 30, 2017

(65) Prior Publication Data
US 2018/0287680 A1   Oct. 4, 2018

(30) Foreign Application Priority Data

Sep. 25, 2015 (CN) .......................... 2015 1 0622661

(51) Int. Cl.
*H04B 7/06* (2006.01)
*H04B 17/309* (2015.01)
*H04W 84/04* (2009.01)

(52) U.S. Cl.
CPC ............ *H04B 7/0626* (2013.01); *H04B 7/06* (2013.01); *H04B 7/063* (2013.01); *H04B 7/0695* (2013.01);
(Continued)

(58) Field of Classification Search
CPC . H04W 24/08; H04W 16/32; H04W 72/0446; H04L 5/0048; H04L 5/0091
See application file for complete search history.

(56) References Cited

U.S. PATENT DOCUMENTS

2010/0296389 A1* 11/2010 Khandekar ........... H04L 5/0007
370/216
2012/0208541 A1   8/2012 Luo et al.
(Continued)

FOREIGN PATENT DOCUMENTS

CN        102685795 A       9/2012
CN        102882612 A       1/2013
(Continued)

OTHER PUBLICATIONS

International Search Report dated Nov. 29, 2016 in PCT/CN2016/099452 filed Sep. 20, 2016.

*Primary Examiner* — Un C Cho
*Assistant Examiner* — Peter K Mak
(74) *Attorney, Agent, or Firm* — Xsensus LLP

(57) ABSTRACT

An electronic device in a wireless communication system, and a wireless communication method. The electronic device includes one or more processing circuits, and is configured to: respond to a measurement instruction from a base station in a wireless communication system, and separately measure channel state information reference signals (CSI-RSs) on one or more antenna ports; and generate feedback information according to the measurement result, so that the base station selects, from the one or more antenna ports, an antenna port used for transmitting to the CSI-RSs to the electronic device, the feedback information including occupation information of occupation condition of each of the one or more antenna ports. Port selection for CSI-RSs can be implemented, beamforming CSI-RS interference
(Continued)

between cells and within a cell can be reduced, and system performance can be improved only requiring very low signaling overheads.

16 Claims, 9 Drawing Sheets

(52) U.S. Cl.
CPC ......... *H04B 17/309* (2015.01); *H04W 84/042* (2013.01)

(56) References Cited

U.S. PATENT DOCUMENTS

| | | | |
|---|---|---|---|
| 2013/0088984 A1* | 4/2013 | Lee | H04L 5/0053 370/252 |
| 2014/0112184 A1 | 4/2014 | Chai | |
| 2014/0211873 A1 | 7/2014 | Park et al. | |
| 2015/0049824 A1* | 2/2015 | Kim | H04B 7/0456 375/267 |
| 2015/0207600 A1 | 7/2015 | Park et al. | |
| 2015/0282122 A1* | 10/2015 | Kim | H04L 25/03898 370/329 |
| 2016/0142189 A1* | 5/2016 | Shin | H04B 7/0626 370/329 |
| 2017/0064675 A1* | 3/2017 | Kim | H04B 7/068 |
| 2017/0164226 A1* | 6/2017 | Wei | H04L 5/0023 |
| 2017/0201898 A1* | 7/2017 | Park | H04L 5/0048 |
| 2017/0332268 A1* | 11/2017 | Yang | H04W 24/00 |
| 2018/0167118 A1* | 6/2018 | Kakishima | H04W 16/32 |
| 2018/0184310 A1* | 6/2018 | Fu | H04L 5/0048 |

FOREIGN PATENT DOCUMENTS

| | | |
|---|---|---|
| CN | 103385032 A | 11/2013 |
| WO | 2014/021565 A1 | 2/2014 |

\* cited by examiner

ELECTRONIC DEVICE IN WIRELESS COMMUNICATION SYSTEM, AND WIRELESS COMMUNICATION METHOD

FIELD

The present disclosure relates to the technical field of wireless communication, and in particular to an electronic device in a wireless communication system and a method for performing wireless communication in a wireless communication system.

BACKGROUND

This section provides background information relating to the present disclosure, which is not necessarily prior art.

In Release 10 (R10) of a Long Term Evolution-Advanced (LTE-A) system, channel state information reference signals (CSI-RSs) are introduced to acquire channel state information. Beamforming is a signal preprocessing technology based on an antenna array, in which, a weighting coefficient of each array element in an antenna array is adjusted to generate a beam with directivity, thereby obtaining an obvious array gain. Therefore, beamforming has advantages in broadening a coverage, improving an edge throughput and interference suppression and so on. Therefore, a beam-formed CSI-RS scheme may function as an enhanced CSI-RS transmission scheme.

However, there are some problems when the beam-formed CSI-RS scheme is adopted. In the LTE-A system, neighboring cells use the same time and frequency resource. Therefore, in a case that a service cell and a neighbor cell transmit beam-formed CSI-RSs by using the same CSI-RS resource and cell cooperation is not supported, great interference occurs. In the existing beam-formed CSI-RS transmission, beamforming for eight ports is supported, and there are five types of resources for CSI-RS transmission, therefore neighboring cells can transmit beam-formed CSI-RSs by using different resources, thereby substantially avoiding interference between beam-formed CSI-RSs. However, in a future LTE-A system, there may be more than eight ports, such as sixteen ports. In addition, cells will become more intensive. In a case that the number of neighboring cells of the service cell is greater than four, five types of CSI-RS resources are not sufficient to avoid the interference between beam-formed CSI-RSs. In the other hand, beamforming is generally performed for users at an edge of the cell, therefore a transmitting power is great; and once the neighboring cells transmit beam-formed CSI-RSs by using the same CSI-RS resource, severe interference occurs. In another aspect, in the service cell, certain interference occurs in a case that beam-formed CSI-RSs are transmitted to two user equipments by using the same CSI-RS resource.

Therefore, for at least one of the above problems, it is necessary to provide a new wireless communication technical solution, so as to solve the interference between beam-formed CSI-RSs and improve the performance of a system.

SUMMARY

This section provides a general summary of the present disclosure, and is not a comprehensive disclosure of its full scope or all of its features.

An object of the present disclosure is to provide an electronic device in a wireless communication system and a method for performing wireless communication in a wireless communication system, such that interference between beam-formed CSI-RSs can be reduced, thereby improving the performance of the system.

According to an aspect of the present disclosure, an electronic device in a wireless communication system is provided, which includes one or more processing circuits configured to perform operations of: measuring channel state information reference signals CSI-RSs on one or more antenna ports respectively, in response to a measurement indication from a base station in the wireless communication system; and generating feedback information based on a measurement result, such that the base station selects an antenna port for transmitting CSI-RSs to the electronic device from the one or more antenna ports, the feedback information including occupation information indicating an occupation condition of each of the one or more antenna ports.

According to another aspect of the present disclosure, an electronic device in a wireless communication system is provided, which includes one or more processing circuits configured to perform operations of: generating a measurement indication such that a user equipment in the wireless communication system measures channel state information reference signals SCI-RSs on one or more antenna ports respectively, based on the measurement indication; configuring CSI-RS resources for the one or more antenna ports; and selecting an antenna port for transmitting CSI-RSs to the user equipment from the one or more antenna ports based on the feedback information from the user equipment, the feedback information including occupation information indicating an occupation condition of each of the one or more antenna ports.

According to another aspect of the present disclosure, a wireless communication system is provided, which includes a user equipment and a base station. The user equipment includes one or more first processing circuits configured to perform operations of: measuring channel state information reference signals CSI-RSs on one or more antenna ports respectively, in response to a measurement indication from the base station; and generating feedback information based on a measurement result, the feedback information including occupation information indicating an occupation condition of each of the one or more antenna ports. The base station includes one or more second processing circuits configured to perform operations of: generating the measurement indication; configuring a CSI-RS resource for the one or more antenna ports; and selecting an antenna port for transmitting the CSI-RS to the user equipment from the one or more antenna ports, based on the feedback information.

According to another aspect of the present disclosure, a method for performing wireless communication in a wireless communication system is provided, which includes: measuring, by a user equipment in the wireless communication system, channel state information reference signal CSI-RSs on one or more antenna ports respectively, in response to a measurement indication from a base station in the wireless communication system; and generating feedback information based on a measurement result, such that the base station selects an antenna port for transmitting CSI-RSs to the user equipment from the one or more antenna ports, the feedback information including occupation information indicating an occupation condition of each of the one or more antenna ports.

According to another aspect of the present disclosure, a method for performing wireless communication in a wireless communication system is provided, which includes: generating a measurement indication such that a user equipment in the wireless communication system measures channel state information reference signals CSI-RSs on one or more antenna ports respectively based on the measurement indication; configuring a CSI-RS resource for the one or more antenna ports; and selecting an antenna port for transmitting the CSI-RSs to the user equipment from the one or more antenna ports, based on feedback information from the user equipment, the feedback information including occupation information indicating an occupation condition of each of the one or more antenna ports.

With the electronic device in the wireless communication system and the method for performing wireless communication in the wireless communication system according to the present disclosure, the CSI-RSs on one or more antenna ports can be measured before the CSI-RSs are transmitted, to select an appropriate antenna port to transmit the CSI-RSs. In this way, ports can be selected for the CSI-RSs, to reduce interference between the CSI-RSs, thereby improving the performance of the system with a small signaling overhead.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figure 1A:
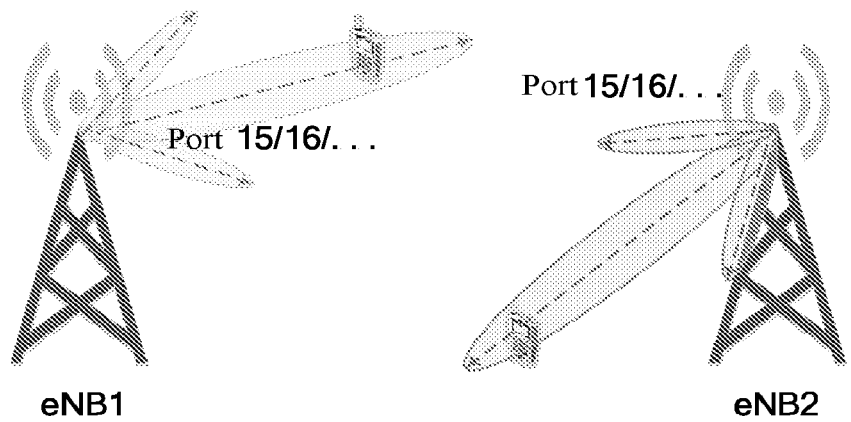
FIG. 1(a) is a schematic diagram showing a scene in which there is interference between beam-formed CSI-RSs.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF EMBODIMENTS

Examples of the present disclosure will now be described more fully with reference to the accompanying drawings. The following description is merely exemplary in nature and is not intended to limit the present disclosure, application, or uses.

Example embodiments are provided such that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

A user equipment (UE) involved in the present disclosure includes but not limited to terminals with a wireless communication function such as a mobile terminal, a computer, and an on-board device. Further, depending on the described functions, the UE involved in the present disclosure may be the UE itself or components in the UE such as a chip. In addition, similarly, a base station involved in the present disclosure may be an evolution Node Base station (eNB) or components in the eNB such as a chip. Thus, the technical solution according to the present disclosure may be applied to a frequency division duplexing (FDD) system.

FIG. 1(a) is a schematic diagram showing a scene in which there is interference between beam-formed CSI-RSs. As shown in FIG. 1(a), eNB1 and eNB2 are base stations of two neighboring cells, and the eNB1 and the eNB2 generate beams by using a port 15 to transmit beam-formed CSI-RSs, thereby resulting in interference. Since beamforming is generally applied to users at an edge of the cell and a corresponding transmitting power is great, interference between CSI-RSs transmitted by the eNB1 and the eNB2 cannot be ignored.

Figure 1B:
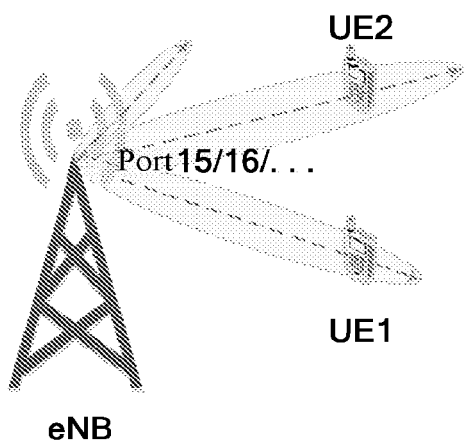
FIG. 1(b) is a schematic diagram showing another scene in which there is interference between beam-formed CSI-RSs.

FIG. 1(b) is a schematic diagram showing another scene in which there is interference between beam-formed CSI-RSs. As shown in FIG. 1(b), there are two user equipments in a coverage of the eNB. If the eNB generates beams by using the port 15 to transmit beam-formed CSI-RSs to the two user equipments, interference will occur. If the two user equipments are close to each other or are located at an edge of the cell resulting in a great transmitting power for beamforming, interference between the two transmitted CSI-RSs cannot be ignored.

Figure 2:
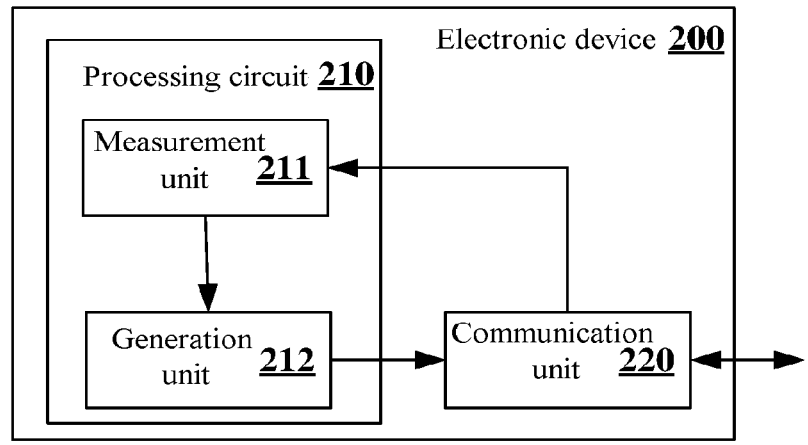
FIG. 2 is a block diagram showing a structure of an electronic device in a wireless communication system according to an embodiment of the present disclosure.

For the above problem, a technical solution according to the present disclosure is provided. FIG. 2 shows a structure of an electronic device 200 in a wireless communication system according to an embodiment of the present disclosure.

As shown in FIG. 2, the electronic device 200 may include a processing circuit 210. It should be noted that, the electronic device 200 may include one processing circuit 210 or multiple processing circuits 210. In addition, the electronic device 200 may include a communication unit 220 as a transceiver and so on.

Further, the processing circuit 210 may include various discrete functional units to perform various different functions and/or operations. It should be noted that, the functional units may be physical entities or logical entities, and units with different names may be implemented by the same physical entity.

For example, as shown in FIG. 2, the processing circuit 210 may include a measurement unit 211 and a generation unit 212.

In the electronic device 200 shown in FIG. 2, in response to a measurement indication from a base station in the wireless communication system, the measurement unit 211 may measure CSI-RSs on one or more antenna ports respectively. Here, the measurement indication from the base station in the wireless communication system may be received by the communication unit 220.

In addition, the generation unit 212 may generate feedback information based on a measurement result, such that the base station selects an antenna port for transmitting the CSI-RS to the electronic device 200 from the one or more antenna ports. Here, the feedback information may be transmitted to the base station by the communication unit 220.

Here, the feedback information may include occupation information indicating an occupation condition of each of the one or more antenna ports.

It should be noted that, the occupation information included in the feedback information only indicates the occupation condition of each of the one or more antenna ports determined by the electronic device 200, and may not indicate actual occupation conditions of the one or more antenna ports. For example, in a case that a specific antenna port is actually occupied and the electronic device 200 determines that the antenna port is not occupied due to a low transmitting power of the antenna port or some other reasons, the feedback information generated by the generation unit 212 of the electronic device 200 indicates that the antenna port is not occupied.

With the electronic device 200 according to the embodiment of the present disclosure, before the CSI-RS is transmitted to the electronic device 200, the electronic device 200 can measure the CSI-RSs on the one or more antenna ports respectively and generate feedback information, such that the base station selects an antenna port for transmitting the CSI-RS. In this way, an appropriate antenna port can be selected to transmit the CSI-RS, thereby avoiding interference between the CSI-RSs and improving the performance of the system.

According to an embodiment of the present disclosure, the one or more antenna port to be measured may be one or more antenna ports of neighboring cells. That is to say, the electronic device 200 may measure CSI-RSs on one or more antenna ports of the neighboring cell respectively, thereby obtaining an occupation condition of each of the one or more antenna ports of the neighboring cell. The base station may select an antenna port not occupied by the neighboring cell for the electronic device 200 to transmit the CSI-RS.

For example, in a scene shown in FIG. 1(a), a UE in a coverage of the eNB1 measures, in response to a measurement indication from the eNB1, CSI-RSs on one or more antenna ports (such as all eight antenna ports) of the neighboring cell respectively, and generates feedback information based on a measurement result. The feedback information includes occupation information indicating that the port 15 has been occupied by a neighboring cell where the eNB2 is located. The eNB1 may transmit the CSI-RS to the UE via an antenna port different from the antenna port 15. In this way, the eNB1 and the eNB2 transmit the CSI-RSs via different antenna ports, thereby avoiding interference between beam-formed CSI-RSs.

According to another embodiment of the present disclosure, the one or more antenna ports to be measured may be one or more antenna ports of a current cell. That is, the electronic device 200 may measure CSI-RSs on one or more antenna ports of the current cell respectively, thereby obtaining an occupation condition of each of the one or more antenna ports of the current cell. The base station may select an antenna port not occupied by other electronic devices of the current cell to transmit the CSI-RS to the electronic device 200.

For example, in the scene shown in FIG. 1(b), the UE1 in the coverage of the eNB measures, in response to a measurement indication from the eNB, CSI-RSs on one or more antenna ports (such as all eight antenna ports) of the current cell respectively, and generates feedback information based on a measurement result. The feedback information includes occupation information indicating that the port 15 has been occupied by UE2. The eNB may transmit the CSI-RS to the UE1 via an antenna port different from the port 15. In this way, the eNB transmits the CSI-RSs to the UE1 and the UE2 via different antenna ports, thereby avoiding interference between beam-formed CSI-RSs.

According to an embodiment of the present disclosure, the number of the one or more antenna ports is n, where n is a natural number. The occupation information includes a bitmap having n bits, and each bit corresponds to one antenna port of the one or more antenna ports.

Here, the electronic device 200 (such as a determination unit, not shown) may determine whether the one or more antenna ports are occupied based on the measurement result of the CSI-RSs on the one or more antenna ports. The generation unit 212 generates feedback information based on information whether the one or more antenna ports are occupied. For example, "1" and "0" may be used to indicate whether the corresponding antenna port is occupied or not. In a case that a certain antenna port is occupied, a bit position corresponding to the antenna port in the bitmap is indicated as "1"; and in a case that a certain antenna port is not occupied, a bit position corresponding to the antenna port in the bitmap is indicated as "0". When receiving the bitmap, the base station can clearly know the occupation condition of the one or more antenna ports for the electronic device 200, and then selects an antenna port for transmitting the CSI-RS to the electronic device 200, for example selecting an antenna port not occupied to transmit the CST-RS.

With the way of bitmap, it is convenient and simple, and the occupation condition of the n antenna ports can be indicated with a small signaling overhead.

According to another embodiment of the present disclosure, the occupation information may include parameters measured for the CSI-RSs on the one or more antenna ports, such as reference signal receiving power (RSRP), reference signal receiving quality (RSRQ), received signal strength indication (RSSI) and channel quality indication (CQI). Here, the electronic device 200 feeds back the parameters measured for the CSI-RSs which indicate occupation information of the one or more antenna ports to the base station, and the base station determines whether the one or more antenna ports are occupied based on the measured parameters, and thus selects an antenna port for transmitting the CSI-RS to the electronic device 200. For example, the base station may select an antenna port with a minimum parameter value measured for the CSI-RS to transmit the CSI-RS.

According to another embodiment of the present disclosure, the occupation information may include a ranking result of parameters (such as RSRP, RSRQ, RSSI and CQI) measured for the CSI-RSs on the one or more antenna ports. Here, the electronic device 200 may rank the parameters measured for the CSI-RSs on different antenna ports in an ascending order or in a descending order, and feeds back a ranking result to the base station. The base station selects an antenna port for transmitting the CSI-RS to the electronic device 200 based on the ranking result. For example, the base station may select an antenna port with a minimum parameter value measured for the CSI-RS to transmit the CSI-RS.

Figure 3:
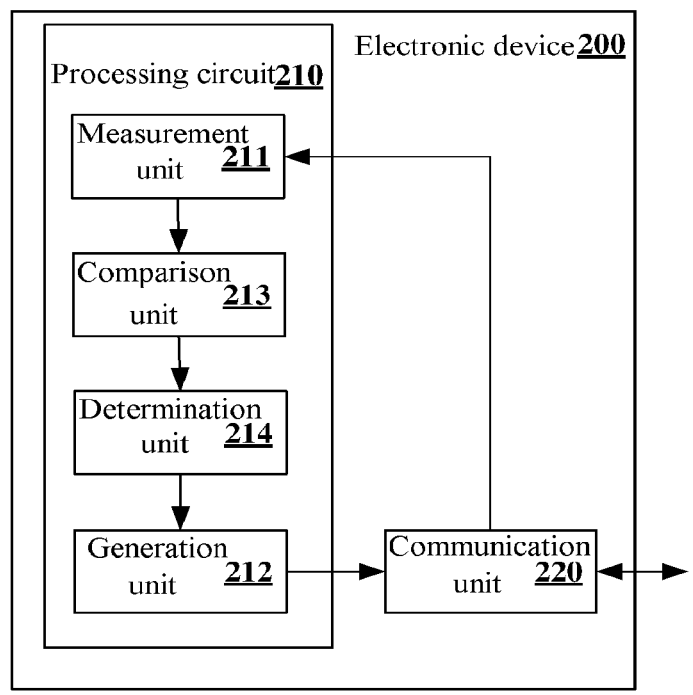
FIG. 3 is a block diagram showing a structure of an electronic device in a wireless communication system according to another embodiment of the present disclosure.

FIG. 3 is a block diagram showing a structure of an electronic device in a wireless communication system according to another embodiment of the present disclosure.

As shown in FIG. 3, the electronic device 200 may include a processing circuit 210 and a communication unit 220. The processing circuit 210 may include a measurement unit 211, a generation unit 212, a comparison unit 213 and a determination unit 214. Here, the measurement unit 211, the generation unit 212 and the communication unit 220 may be the measurement unit 211, the generation unit 212 and the communication unit 220 shown in FIG. 2. In the electronic device 200 shown in FIG. 3, the comparison unit 213 may compare a measurement result of the measurement unit 211 with a predetermined threshold, and the determination unit 214 may determine occupation information based on a comparison result of the comparison unit 213.

Here, a predetermined threshold may be informed to the electronic device 200 by the base station. For example, after the base station transmits a measurement indication to the electronic device 200, the base station continues to transmit threshold information to the electronic device 200. The predetermined threshold may be known by the electronic device 200 in advance, for example the predetermined threshold is written in a chip of the electronic device 200 in advance.

In addition, the predetermined threshold may include one or more thresholds. When the predetermined threshold includes one threshold, thresholds of measurement results of the CSI-RSs on the one or more antenna ports are the same. That is, the comparison unit 213 compares the measurement results of the CSI-RSs on the one or more antenna ports with the threshold. In a case that there are multiple antenna ports, the predetermined threshold may include multiple thresholds which respectively correspond to measurement results of the CSI-RSs on the multiple antenna ports. The comparison unit 213 compares the measurement results of the CSI-RSs on the multiple antenna ports with corresponding thresholds respectively.

According to an embodiment of the present disclosure, parameters obtained by performing measurement on the CSI-RS by the processing circuit 210 include at least one of RSRP, RSRQ, RSSI and CQI. The above parameters are all parameters indicating a receiving quality of the antenna port, therefore may reflect an occupation condition of the antenna port.

According to an embodiment of the present disclosure, in a case that a parameter value obtained by performing measurement on the CSI-RS is greater than a predetermined threshold, the processing circuit 210 determines that an antenna port for transmitting the CSI-RS is occupied.

According to an embodiment of the present disclosure, if the processing circuit 210 determines that one or more antenna ports are all occupied, that is, parameter values obtained by performing measurement on the CSI-RS on the one or more antenna ports are all greater than the predetermined threshold, the processing circuit 210 may indicate a bit position corresponding to an antenna port with a minimum parameter value obtained by performing measurement on the CSI-RS as "0" in the bitmap. In this way, the base station may select the antenna port with the minimum parameter value obtained by performing measurement on the CSI-RS to transmit the CSI-RS.

Here, the base station can configure a zero-resource (ZP) CSI-RS resource for one or more antenna ports of a current cell where the electronic device 200 is located, such that the electronic device 200 measures CSI-RSs on one or more antenna ports of a neighboring cell. In this case, the ZP CSI-RS resource is configured for one or more antenna ports of the current cell, the one or more antenna ports of the neighboring cell may be occupied with a great probability if the measurement unit 211 measures CSI-RSs on the one or more antenna ports. Therefore, a predetermined threshold may be set according to actual cases, and it is determined that a respective antenna port is occupied by the neighboring cell in a case that a measurement result is greater than the predetermined threshold.

According to an embodiment of the present disclosure, the base station may configure the ZP CSI-RS resource for all antenna ports of the current cell where the electronic device 200 is located, therefore the electronic device 200 may measure CSI-RSs on all antenna ports of the neighboring cell. In addition, the base station may configure the ZP CSI-RS resource for a part of antenna ports of the current cell where the electronic device 200 is located, therefore the electronic device 200 may measure CSI-RSs on a corresponding part of antenna ports of the neighboring cell. For example, if the base station configures the ZP CSI-RS resource for antenna ports 1 to 4 of the current cell where the electronic device 200 is located, therefore the electronic device 200 may measure CSI-RSs on antenna ports 1 to 4 of the neighboring cell.

It should be noted that, in the embodiments of the present disclosure, the antenna port numbers are indicated schematically, for example an antenna port 0, an antenna port 1, and antenna ports 1 to 4. In the existing system, antenna port numbers for the CSI-RS are 15 to 22. The antenna port numbers in the embodiments of the present disclosure are used only to illustrate a subject of the present disclosure, and do not conflict with the antenna port numbers adopted in the existing system. Further, in a future system, the port numbers for the CSI-RS may be redefined as other values, in which the present disclosure is still adoptable.

According to an embodiment of the present disclosure, in a case that the electronic device 200 needs to measure CSI-RSs on one or more antenna ports of the current cell and the current cell and the neighboring cell use orthogonal CSI-RS resources, no interference between the CSI-RSs exists between the current cell and the neighboring cell, therefore the base station is unnecessary to configure the ZP CSI-RS resource for one or more antenna ports of the current cell where the electronic device 200 is located. If the measurement unit 211 measures the CSI-RSs on the one or more antenna ports of the current cell, the one or more antenna ports are occupied by other user equipments of the current cell with a great probability. Therefore, a predetermined threshold may be set according to actual cases. In a case that the comparison unit 213 determines that a measurement result is greater than the predetermined threshold, the determining unit 214 determines that the corresponding antenna port is occupied by other user equipments of the current cell. In a case that the measurement result determined by the comparison unit 213 is less than or equal to the predetermined threshold, the determining unit 214 determines that the corresponding antenna port is not occupied by other users of the current cell, or the corresponding antenna port is occupied by other users of the current cell but no harmful interference is generated for the electronic device 200.

According to the embodiment of the present disclosure, in a case that the electronic device 200 needs to measure CSI-RSs on one or more antenna ports of the current cell and the current cell and the neighboring cell do not use orthogonal CSI-RS resources, firstly, the base station needs to configure the ZP CSI-RS resource for one or more antenna ports of the current cell where the electronic device 200 is located so that CSI-RSs on one or more antenna ports of the neighboring cell are measured, and thus whether the one or more antenna ports are occupied by the neighboring cell is determined. This step is similar to that described in the above embodiments. Subsequently, one or more antenna ports of the current cell transmit CSI-RSs normally so that the CSI-RSs on one or more antenna ports of the current cell are measured. In this case, if the measurement unit 211 measures the CSI-RSs on the one or more antenna ports of the current cell, the one or more antenna ports may be occupied by the neighboring cell, or may be occupied by other user equipments of the current cell. Subsequently, the determination unit 214 may analyze the two measurement results to determine the occupation condition of the one or more antenna ports of the current cell by other user equipments of the current cell.

According to an embodiment of the present disclosure, the CSI-RSs are transmitted and beam-formed only through a part of antenna ports.

In the existing beam-forming scheme, one antenna port may correspond to one beam, or multiple antenna ports may correspond to one beam. According to an embodiment of the present disclosure, in a case that one antenna port corresponds to one beam, the electronic device 200 measures CSI-RSs on each antenna port of the one or more antenna ports. In a case that multiple antenna ports correspond to one beam, the electronic device 200 may measure the CSI-RSs by taking the multiple antenna ports as one group.

According to an embodiment of the present disclosure, when the CSI-RS is beam-formed, the occupation information includes a bitmap having n/m bits. In which, n indicates the number of the one or more antenna ports, m indicates that m antenna ports correspond to one beam, n and m are both natural numbers, and each bit in the bitmap corresponds to m antenna ports corresponding to one beam. That is, a bit of "1" indicates that the corresponding m antenna ports are occupied, and a bit of "0" indicates that the corresponding m antenna ports are not occupied. It follows that, the case that the occupation information includes the bitmap having n bits is a special case when m is equal to 1 here.

In the existing scheme for the CSI-RS which does not introduce beamforming, the base station only configures a ZP XSI-RS resource or a non-zero power (NZP) CSI-RS resource for all antenna ports of the current cell where the electronic device is located, and transmits the CSI-RSs by using all antenna ports, and the electronic device measures the CSI-RS by taking all antenna ports of the cell as a whole and reports the CSI. Since all antenna ports are used to transmit the CSI-RS by default according to the communication protocol, an occupation condition of each antenna port of the cell is not concerned. In the present disclosure, the base station may configure the ZP CSI-RS for a part of antenna ports of the current cell where the electronic device 200 is located, the electronic device 200 may measure the CSI-RSs on respective antenna ports of the neighboring cell respectively, therefore an occupation condition of each antenna port of the neighboring cell can be obtained. As needed, an occupation condition of a part of antenna ports of the neighboring cell can also be obtained, and thus the base station can dynamically select the ports for the UEs, i.e., supporting UE-specific port selection.

According to an embodiment of the present disclosure, the measurement indication is included in radio resource control RRC signaling. This is because the RRC signaling is high layer signaling, the RRC signaling has a longer configuration period and more resources as compared with physical layer signaling such as downlink control information (DCI) signaling, thereby being beneficial to bear a measurement indication.

Here, a new request AllPortMeasRequest is defined to instruct the electronic device 200 to measure CSI-RSs on one or more antenna ports respectively. According to an embodiment of the present disclosure, the AllPortMeasRequest request may occupy 1 bit. Specifically, in a case that AllPortMeasRequest=1, the electronic device 200 is instructed to measure the CSI-RSs on the one or more antenna ports respectively. In a case that AllPortMeasRequest=0, the electronic device 200 may be instructed to measure CSI-RSs on specified antenna ports, similar to the conventional technology. Similarly, a new response AllPortMeasResponse may be defined to bear feedback information of the electronic device 200.

It should be noted that, the wireless communication system described above may be an LTE-A cellular communication system, and the electronic device 200 may be a user equipment in the wireless communication system.

Figure 4:
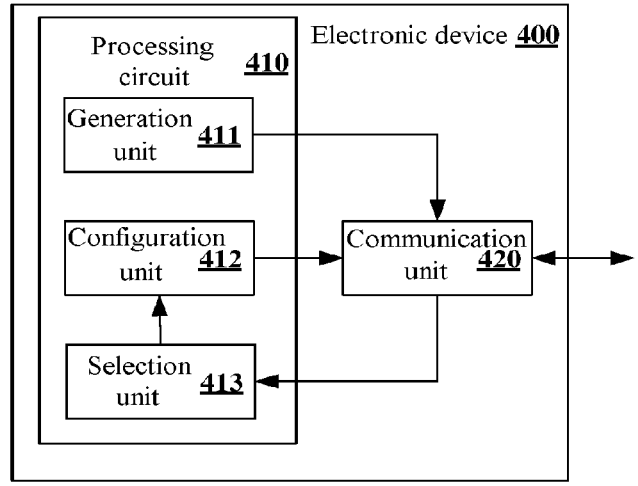
FIG. 4 is a block diagram showing a structure of an electronic device in a wireless communication system according to another embodiment of the present disclosure.

FIG. 4 is a block diagram showing a structure of an electronic device in a wireless communication system according to another embodiment of the present disclosure.

As shown in FIG. 4, the electronic device 400 may include a processing circuit 410. It should be noted that, the electronic device 400 may include one processing circuit 410 or multiple processing circuits 410. In addition, the electronic device 400 may further include a communication unit 420 such as a transceiver.

As mentioned above, similarly, the processing circuit 410 may include various discrete functional units to perform various different functions and/or operations. The functional units may be physical entities or logical entities, and units with different names may be implemented by the same physical entity.

For example, as shown in FIG. 4, the processing circuit 410 may include a generation unit 411, a configuration unit 412 and a selection unit 413.

The generation unit 411 generates a measurement indication, such that a user equipment in the wireless communication system measures CSI-RSs on one or more antenna ports respectively based on the measurement indication. For example, the measurement indication may be transmitted to the user equipment via the communication unit 420.

The configuration unit 412 configures CSI-RS resources for the one or more antenna ports.

Based on feedback information from the user equipment, the selection unit 413 may select an antenna port for transmitting CSI-RSs to the user equipment from the one or more antenna ports. For example, the feedback information may be received from the user equipment via the communication unit 420.

Here, the feedback information includes occupation information indicating an occupation condition of each of the one or more antenna ports.

Preferably, the number of the one or more antenna ports is n. In which, n is a natural number, the occupation information includes a bitmap having n bits, and each bit corresponds to one antenna port of the one or more antenna ports.

Preferably, the CSI-RSs are transmitted and beam-formed only through a part of antenna ports.

Preferably, the processing circuit 410 includes the measurement indication in the RRC signaling.

Preferably, the processing circuit 410 generates a measurement indication to instruct the user equipment to measure CSI-RSs on all antenna ports of a neighboring cell, and the processing circuit 410 configures ZP CSI-RS resources for all antenna ports of a current cell where the user equipment is located.

Preferably, the measurement indication occupies 1 bit.

Preferably, the configuration unit 412 in the processing circuit 410 is further configured to perform an operation of: reconfiguring NZP CSI-RS resources for the selected antenna port for transmitting the CSI-RSs to the user equipment.

According to an embodiment of the present disclosure, one antenna port may be selected to transmit the CSI-RS to the user equipment, or multiple antenna ports may be selected, for example, a pair of antenna ports are selected to transmit the CSI-RS to the user equipment. In a case that one antenna port is selected and both the current cell and the neighboring cell have eight antenna ports, index information may be used to indicate the selected antenna port for transmitting the CSI-RS to the user equipment. For example, index=0 indicates selecting an antenna port 0, and index=1 indicates selecting an antenna port 1, and so on. In a case that both the current cell and the neighboring cell have more than eight, for example sixteen, antenna ports, bits of the index may be increased to bear port indication information. In a case that a pair of antenna ports are selected and both the current cell and the neighboring cell have eight antenna ports, index information may also be used to indicate the selected pair of antenna ports for transmitting the CSI-RS to the user equipment. For example, it is previously agreed between the base station and the user equipment that: index=0 indicates an antenna port pair (0, 1), index=1 indicates an antenna port pair (2, 3), index=2 indicates an antenna port pair (4, 5), and index=3 indicates an antenna port pair (6, 7). Two bits are used to carry index information. In a case that both the current cell and the neighboring cell have more than eight, for example sixteenth, antenna ports, bits of the index may be increased to bear the port indication information.

According to an embodiment of the present disclosure, in a case that the selection unit 413 selects an antenna port for transmitting CSI-RSs to the user equipment from the one or more antenna ports, the configuration unit 412 may reconfigure NZP CSI-RS resources for the selected antenna port. Subsequently, based on the reconfigured NZP CSI-RS resources, the user equipment measures the CSI-RSs on the selected antenna port, and then feeds back CSI to the electronic device 400.

Preferably, the processing circuit 420 includes the selected antenna port for transmitting the CSI-RS to the user equipment in RRC signaling.

According to an embodiment of the present disclosure, IE PhysicalConfigDedicated is modified, and PhysicalConfigDedicated-r13 is added. PhysicalConfigDedicated-r13 is defined as follows:

```
PhysicalConfigDedicated-r13::=
SEQUENCE{
PortSelectionResult        CHOICE{
Release NULL,
Setup BIT STRING (3).
}
```

In which, PortSelectionResult indicates the antenna port for transmitting the CSI-RS to the user equipment selected from the one or more antenna ports. BIT STRING (3) indicates that three bits are used to indicate eight antenna ports in a case that both the current cell and the neighboring cell have eight antenna ports. In a future LTE-A system, in a case that the current cell and the neighboring cell may have more than eight, for example sixteen, antenna ports, four bits are used to indicate sixteen antenna ports and BIT STRING is four. That is, BIT STRING indicates a bit number for indicating the CSI-RS antenna ports.

Further, corresponding RRC flows needs to be modified as follows.

1> If radioResourceConfigDedicated includes physicalConfigDedicated;
2> reconfigure a configuration of a physical channel; and
3> if PortSelectionResult is configured in physicalConfigDedicated, the base station transmits information on the selected port.

Preferably, the electronic device 400 is a base station, and the communication unit 420 in the electronic device 400 is a transceiver configured to communicate with the user equipment.

Figure 5:
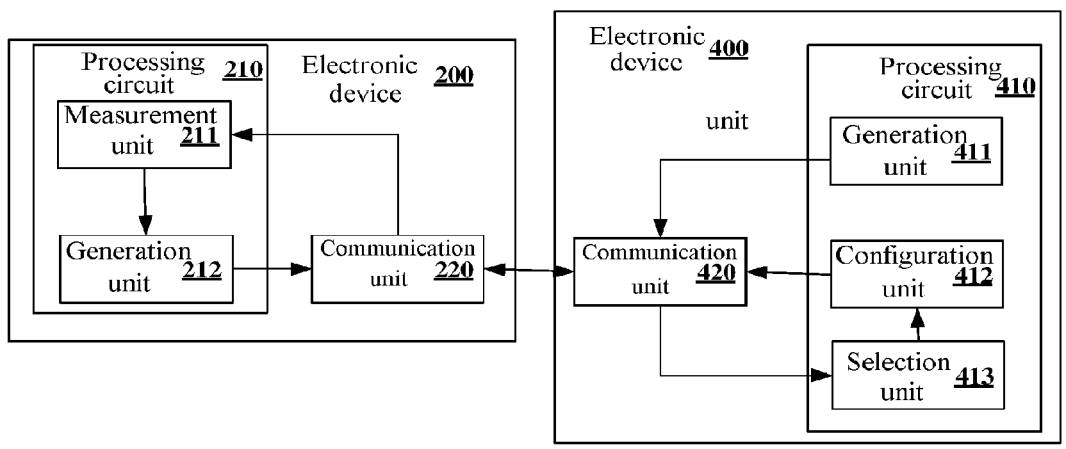
FIG. 5 is a block diagram showing a structure of a wireless communication system according to an embodiment of the present disclosure.

FIG. 5 is a block diagram showing a structure of a wireless communication system according to an embodiment of the present disclosure.

As shown in FIG. 5, the wireless communication system includes an electronic device 200 and an electronic device 400. The electronic device 200 may be a user equipment, and the electronic device 400 may be a base station. The electronic device 200 includes one or more processing circuits 210 and a communication unit 220. The processing circuit 210 includes a measurement unit 211 and a generation unit 212. In response to a measurement indication from the electronic device 400, the measurement unit 211 measures CSI-RSs on one or more antenna ports respectively. The generation unit 212 generates feedback information based on a measurement result, and the feedback information includes occupation information indicating an occupation condition of each of the one or more antenna ports. The electronic device 400 includes one or more processing circuits 410 and a communication unit 420. The processing circuit 410 includes a generation unit 411, a configuration unit 412 and a selection unit 413. The generation unit 411 generates a measurement indication. The configuration unit 412 configures CSI-RS resources for the one or more antenna ports. Based on feedback information, the selection unit 413 selects an antenna port for transmitting the CSI-RS to the electronic device 200 from the one or more antenna ports.

Figure 6:
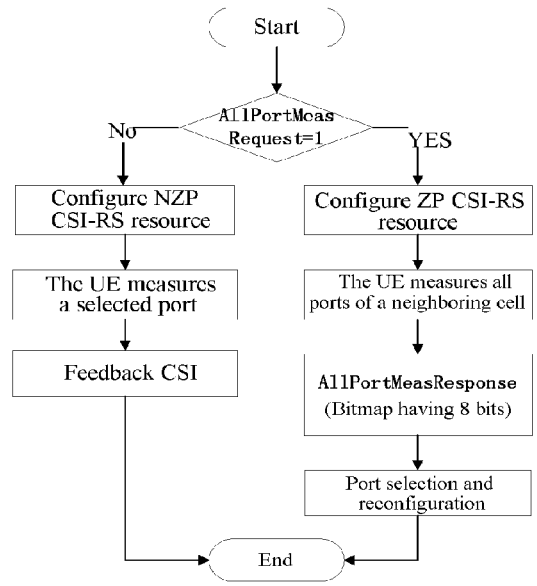
FIG. 6 is a schematic diagram showing a process of a wireless communication method according to an embodiment of the present disclosure.

FIG. 6 is a schematic diagram showing a process of a wireless communication method according to an embodiment of the present disclosure.

As shown in FIG. 6, a new request AllPortMeasRequest is defined. In a case that AllPortMeasRequest=1, the base station configures ZP CSI-RS resources for all (eight) antenna ports of a current cell where the user equipment is located, to instruct the user equipment to measure CSI-RSs of all antenna ports of a neighboring cell.

Subsequently, the user equipment measures CSI-RSs on all antenna ports of the neighboring cell respectively.

Subsequently, the user equipment generates feedback information based on a measurement result. A new response AllPortMeasResponse is defined to bear feedback information. The feedback information includes occupation information indicating an occupation condition of each of the eight antenna ports of the neighboring cell, and the occupation information includes a bitmap having eight bits.

Subsequently, the base station selects, based on the feedback information from the user equipment, an antenna port for transmitting CSI-RSs to the user equipment from the eight antenna ports, and reconfigures NZP CSI-RS resources for the selected antenna port. The process ends.

In a case that AllPortMeasRequest is not 1, for example equal to 0, the base station configures NZP CSI-RS resources for the selected antenna port.

Subsequently, the user equipment measures CSI-RSs on the selected antenna port.

Subsequently, the user equipment feeds back CSI information to the base station, and the process ends.

Figure 7:
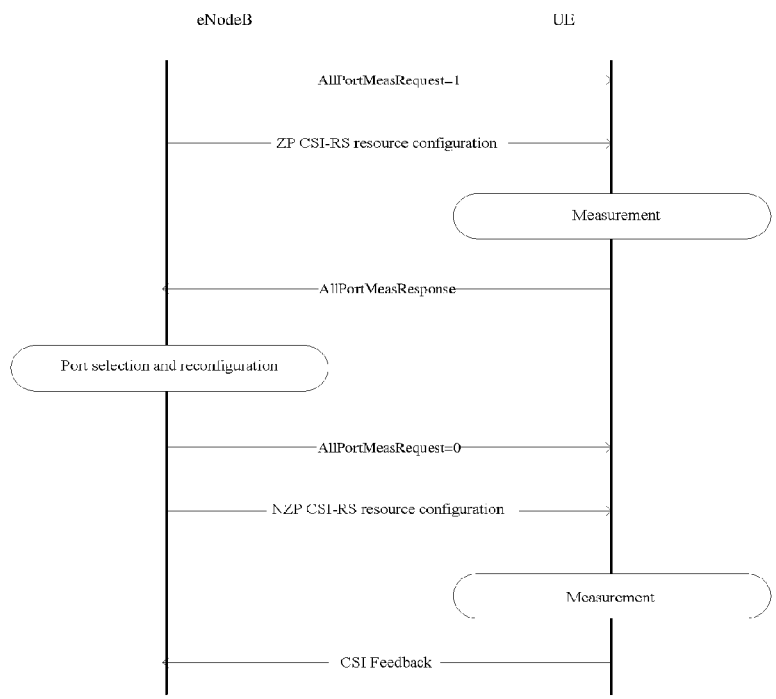
FIG. 7 is a timing diagram of a wireless communication method according to an embodiment of the present disclosure.

FIG. 7 is a timing diagram of a wireless communication method according to an embodiment of the present disclosure.

As shown in FIG. 7, firstly, an eNodeB transmits signaling of AllPortMeasRequest=1 to a UE, to instruct the UE to measure CSI-RSs on all antenna ports of a neighboring cell respectively.

Subsequently, the eNodeB configures ZP CSI-RS resources for all antenna ports of a current cell where the UE is located.

Subsequently, the UE measures CSI-RSs on all antenna ports of the neighboring cell respectively.

Subsequently, the UE transmits feedback information to the eNodeB via AllPortMeasResponse signaling.

Subsequently, the eNodeB selects an antenna port for transmitting CSI-RSs to the UE from all antenna ports, and reconfigures NZP CSI-RS resources for the selected antenna port.

Subsequently, the eNodeB transmits signaling of AllPortMeasRequest=0 to the UE, to instruct the UE to measure CSI-RSs on the selected antenna port.

Subsequently, the eNodeB transmits reconfigured NZP CSI-RS resources to the UE.

Subsequently, the UE measures the CSI-RSs on the selected antenna port by using the NZP CSI-RS resource.

Finally, the UE transmits CSI feedback information to the eNodeB.

Here, the step of transmitting signaling of AllPortMeasRequest=0 to the UE by the eNodeB may be omitted. In a case that the eNodeB transmits the reconfigured NZP CSI-RS resource to the UE, the UE determines that CSI-RS information on the specified antenna port needs to be measured.

It should be noted that, in the embodiments shown in FIG. 6 and FIG. 7, the UE measures CSI-RSs on all antenna ports of the neighboring cell, and the number of all the antenna ports of the neighboring cell is specified as eight in the example shown in FIG. 6, which is not limited in the present disclosure. For a case that the UE measures CSI-RSs on a part of antenna ports of the neighboring cell or a case that the number of all the antenna ports of the neighboring cell is not eight, the process and the timing diagram are similar to FIG. 6 and FIG. 7, which are not described in detail here in the present disclosure.

In summary, according to the embodiments of the present disclosure, in a scene of transmitting beam-formed CSI-RSs between cells, before the beam-formed CSI-RS is transmitted to the user equipment, an occupation condition of the neighboring cell antenna port may be measured, thereby selecting a port not occupied by the neighboring cell to transmit beam-formed CSI-RSs. In this way, ports selection in a scene of the beam-formed CSI-RSs is supported, thereby avoiding interference between beam-formed CSI-RSs among cells, and improving the performance of the system. In a scene of transmitting beam-formed CSI-RSs in a cell, before the beam-formed CSI-RSs is transmitted to the user equipment, an occupation condition of the antenna ports of the cell can be measured, thereby selecting a port not occupied by other user equipments of the cell to transmit beam-formed CSI-RSs. In this way, ports can be selected and reused for beam-formed CSI-RSs in the cell, and interference between beam-formed CSI-RSs is avoided when the port is reused. In addition, for the above two scenes, the user equipment only needs to feed back one bitmap with a small signaling overhead.

Figure 8:
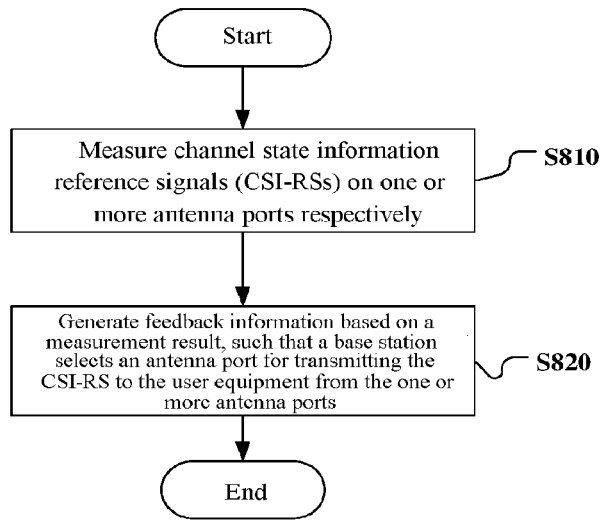
FIG. 8 is a flowchart of a wireless communication method according to an embodiment of the present disclosure.

Subsequently, a method for performing wireless communication in a wireless communication system according to an embodiment of the present disclosure is described with reference to FIG. 8. FIG. 8 shows a flowchart of a wireless communication method according to an embodiment of the present disclosure.

As shown in FIG. 8, firstly, in step S810, in response to a measurement indication from a base station in the wireless communication system, a user equipment in the wireless communication system measures CSI-RSs on one or more antenna ports respectively.

Then, in step S820, feedback information is generated based on a measurement result, such that the base station selects an antenna port for transmitting CSI-RSs to the user equipment from the one or more antenna ports. The feedback information includes occupation information indicating an occupation condition of each of the one or more antenna ports.

Preferably, the number of the one or more antenna ports is n. In which, n is a natural number, the occupation information includes a bitmap having n bits, and each bit corresponds to one antenna port of the one or more antenna ports.

Preferably, step S820 further includes: comparing a measurement result with a predetermined threshold; and determining occupation information based on a comparison result.

Preferably, the CSI-RSs are transmitted and beam-formed only through a part of antenna ports.

Preferably, the measurement indication is included in RRC signaling.

Preferably, parameters obtained by performing measurement on the CSI-RS include at least one of RSRP, RSRQ, RSSI and CQI.

Preferably, the process of determining occupation information based on the comparison result further includes: determining that the antenna port for transmitting the CSI-RS is occupied in a case that a parameter value obtained by performing measurement on the CSI-RS is greater than a predetermined threshold.

Preferably, the wireless communication system is an LTE-A cellular communication system.

Figure 9:
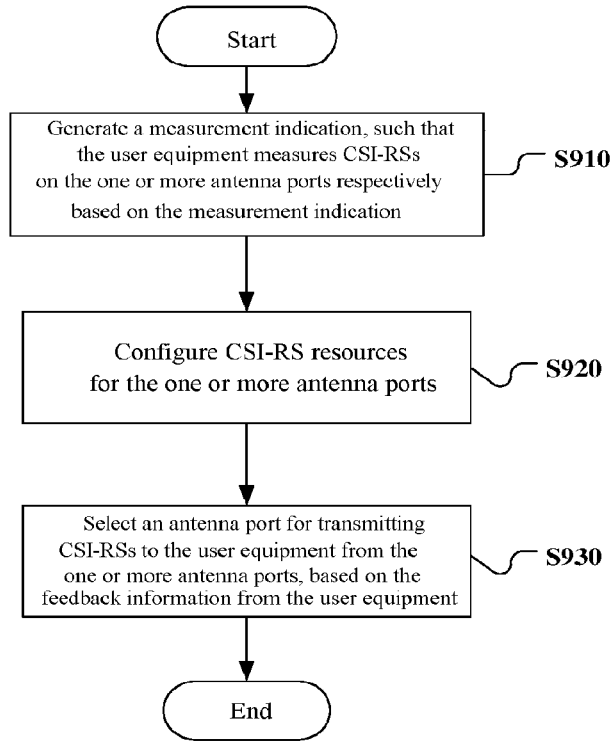
FIG. 9 is a flowchart of a wireless communication method according to another embodiment of the present disclosure.

Subsequently, a method for performing wireless communication in a wireless communication system according to another embodiment of the present disclosure is described with reference to FIG. 9. FIG. 9 shows a flowchart of a wireless communication method according to another embodiment of the present disclosure.

As shown in FIG. 9, firstly, in step S910, a measurement indication is generated, such that a user equipment in the wireless communication system measures CSI-RSs on one or more antenna ports respectively based on the measurement indication.

Then, in step S920, CSI-RS resources are configured for the one or more antenna ports.

Finally, in step S930, based on feedback information from the user equipment, an antenna port for transmitting CSI-RSs to the user equipment is selected from the one or more antenna ports. The feedback information includes occupation information indicating an occupation condition of each of the one or more antenna ports.

Preferably, the number of the one or more antenna ports is n. In which, n is a natural number, the occupation information includes a bitmap having n bits, and each bit corresponds to one antenna port of the one or more antenna ports.

Preferably, the CSI-RSs are transmitted and beam-formed only through a part of antenna ports.

Preferably, the measurement indication is included in RRC signaling.

Preferably, step S910 includes: generating a measurement indication to instruct the user equipment to measure CSI-RSs on all antenna ports of a neighboring cell. Step S920 includes: configuring ZP CSI-RS resources for all antenna ports of a current cell where the user equipment is located.

Preferably, the wireless communication method further includes: reconfiguring NZP CSI-RS resources for the selected antenna port for transmitting CSI-RSs to the user equipment.

Preferably, the measurement indication occupies 1 bit.

Specific implementations of steps of the method for performing wireless communication in the wireless communication system according to the embodiments of the present disclosure are described in detail above, which are not repeated here.

The technology according to the present disclosure may be applied to various types of products. For example, the base station mentioned in the present disclosure may be implemented as any type of evolution Node B (eNB), such as a macro eNB and a small eNB. The small eNB may be an eNB of a cell with a coverage less than that of a macro cell, such as a pico-eNB, a micro-eNB and a household (femto) eNB. Alternatively, the base station may be implemented as any other types of base stations, such as a NodeB and a base transceiver station (BTS). The base station may include: a body configured to control wireless communication (also referred to as a base station device); and one or more remote radio head-ends (RRHs) arranged at different places from the body. In addition, various types of terminals described in the following may function as a base station to operate by performing functions of the base station temporarily or in a semi-persistent manner.

For example, the UE mentioned in the present disclosure may be implemented as a mobile terminal (such as a smart phone, a tablet personal computer (PC), a notebook PC, a portable game terminal and a portable/dongle mobile router and a digital camera) or a vehicle-mounted terminal (such as an automobile navigation device). The UE may be further implemented as a terminal performing machine to machine (M2M) communication (also referred to as a MTC terminal). In addition, the UE may be a wireless communication module installed on each of the above terminals (such as an integrated circuit module including a single wafer).

Figure 10:
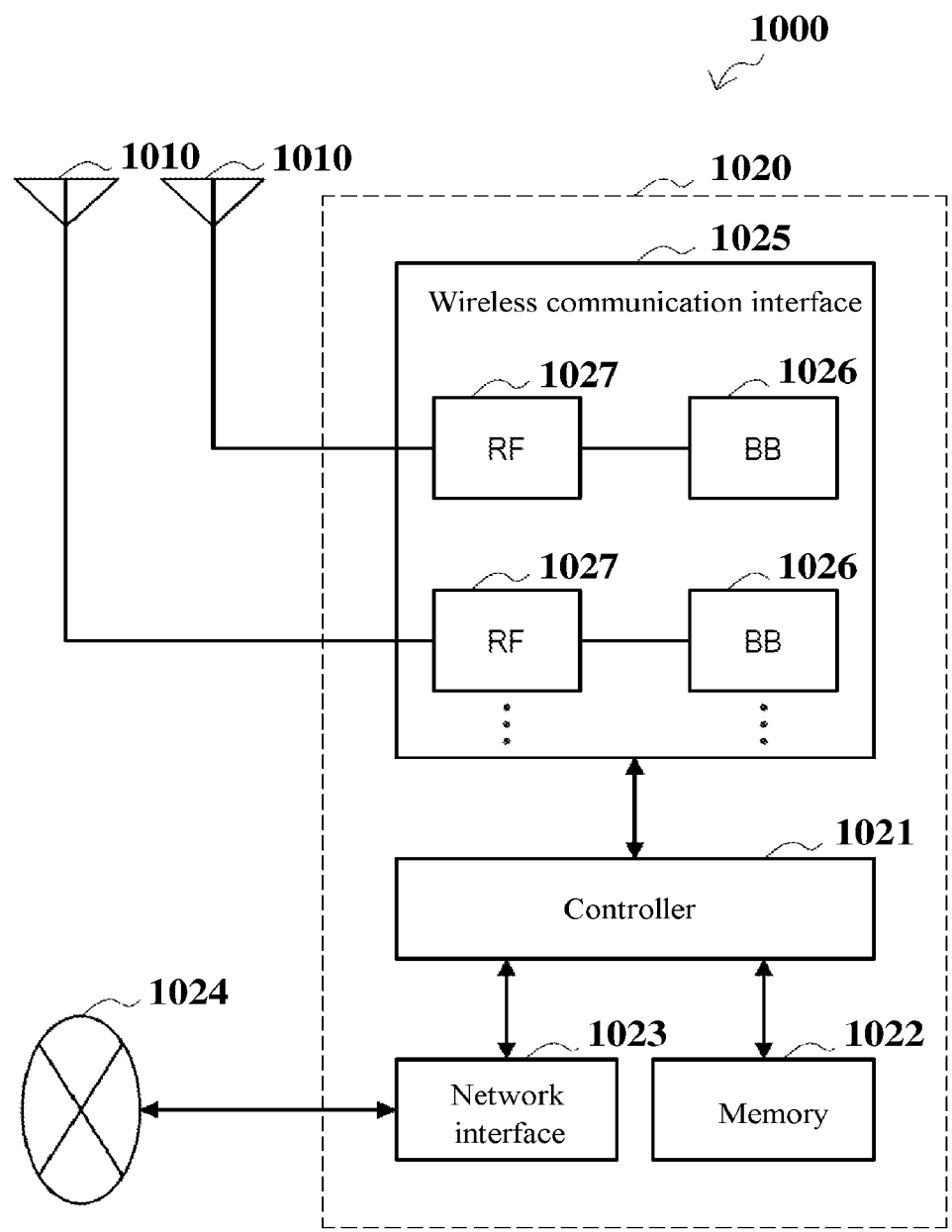
FIG. 10 is a block diagram showing a first example of a schematic configuration adapting to an evolution Node Base Station (eNB) according to the present disclosure.

FIG. 10 is a block diagram showing a first example of a schematic configuration of an eNB to which the technology of the present disclosure may be applied. An eNB 1000 includes one or more antennas 1010 and a base station device 1020. The base station device 1020 and each antenna 1010 may be connected to each other via an RF cable.

Each of the antennas 1010 includes a single or multiple antenna elements (such as multiple antenna elements included in a multiple-input multiple-output (MIMO) antenna) and is used for the base station device 1020 to transmit and receive a wireless signal. As shown in FIG. 10, the eNB 1000 may include multiple antennas 1010. For example, the multiple antennas 1010 may be compatible with multiple frequency bands used by the eNB 1000. Although FIG. 10 shows an example in which the eNB 1000 includes multiple antennas 1010, the eNB 1000 may include a single antenna 1010.

The base station device 1020 includes a controller 1021, a memory 1022, a network interface 1023 and a wireless communication interface 1025.

The controller 1021 may be a CPU or DSP for example and controls various types of functions of higher layers of the base station device 1020. For example, the controller 1021 generates a data packet according to data in a signal processed by the wireless communication interface 1025, and transfers the generated packet via the network interface 1023. The controller 1021 may bundle data from multiple baseband processors to generate a bundle packet and transfers the generated bundle packet. The controller 1021 may have logic functions to perform the following control: such as wireless resource control, wireless bearer control, mobility management, admission control and schedule. The control may be implemented in conjunction with an eNB or a core network node nearby. The memory 1022 includes an RAM and an ROM and stores programs performed by the controller 1021 and various types of control data (such as a terminal list, transmission power data and schedule data).

The network interface 1023 is a communication interface connecting a base station device 1020 to a core network 1024. The controller 1021 may communicate with a core network node or another eNB via the network interface 1023. In this case, the eNB 1000 may be connected to the core network node or other eNB via a logic interface (such as an S1 interface and an X2 interface). The network interface 1023 may also be a wired communication interface or a wireless communication interface for a wireless backhaul line. If the network interface 1023 is a wireless communication interface, the network interface 1023 may use a higher frequency band for wireless communication as compared with a frequency band used by the wireless communication interface 1025.

The wireless communication interface 1025 supports any cellular communication scheme (such as Long Term Evolution (LTE) and LTE-advanced), and provide wireless connection to a terminal in a cell of the eNB 1000 via an antenna 1010. The wireless communication interface 1025 may generally include a baseband (BB) processor 1026 and an RF circuit 1027. The BB processor 1026 may perform for example encoding/decoding, modulating/demodulating and multiplexing and de-multiplexing and perform various types of signal processing of layers (such as L1, medium access control (MAC), radio link control (RLC) and packet data convergence protocol (PDCP). Instead of a controller 1021, the BB processor 1026 may have a part or all of the logic functions described above. The BB processor 1026 may be a memory storing communication control programs, or a module including a processor configured to perform programs and related circuits. Updating programs may change functions of the BB processor 1026. The module may be a card or a blade inserted to a slot of the base station device 1020. Alternatively, the module may also be a chip installed on the card or the blade. Meanwhile, an RF circuit 1027 may include for example a mixer, a filter and an amplifier, and transmits and receives a wireless signal via the antenna 1010.

As shown in FIG. 10, the wireless communication interface 1025 may include multiple BB processors 1026. For example, the multiple BB processors 1026 may be compatible with multiple frequency bands used by the eNB 1000. As shown in FIG. 10, the wireless communication interface 1025 may include multiple RF circuits 1027. For example, the multiple RF circuits 1027 may be compatible with multiple antenna elements. Although FIG. 10 shows an example in which the wireless communication interface 1025 includes multiple BB processors 1026 and multiple RF circuits 1027, the wireless communication interface 1025 may include a single BB processor 1026 or a single RF circuit 1027.

Figure 11:
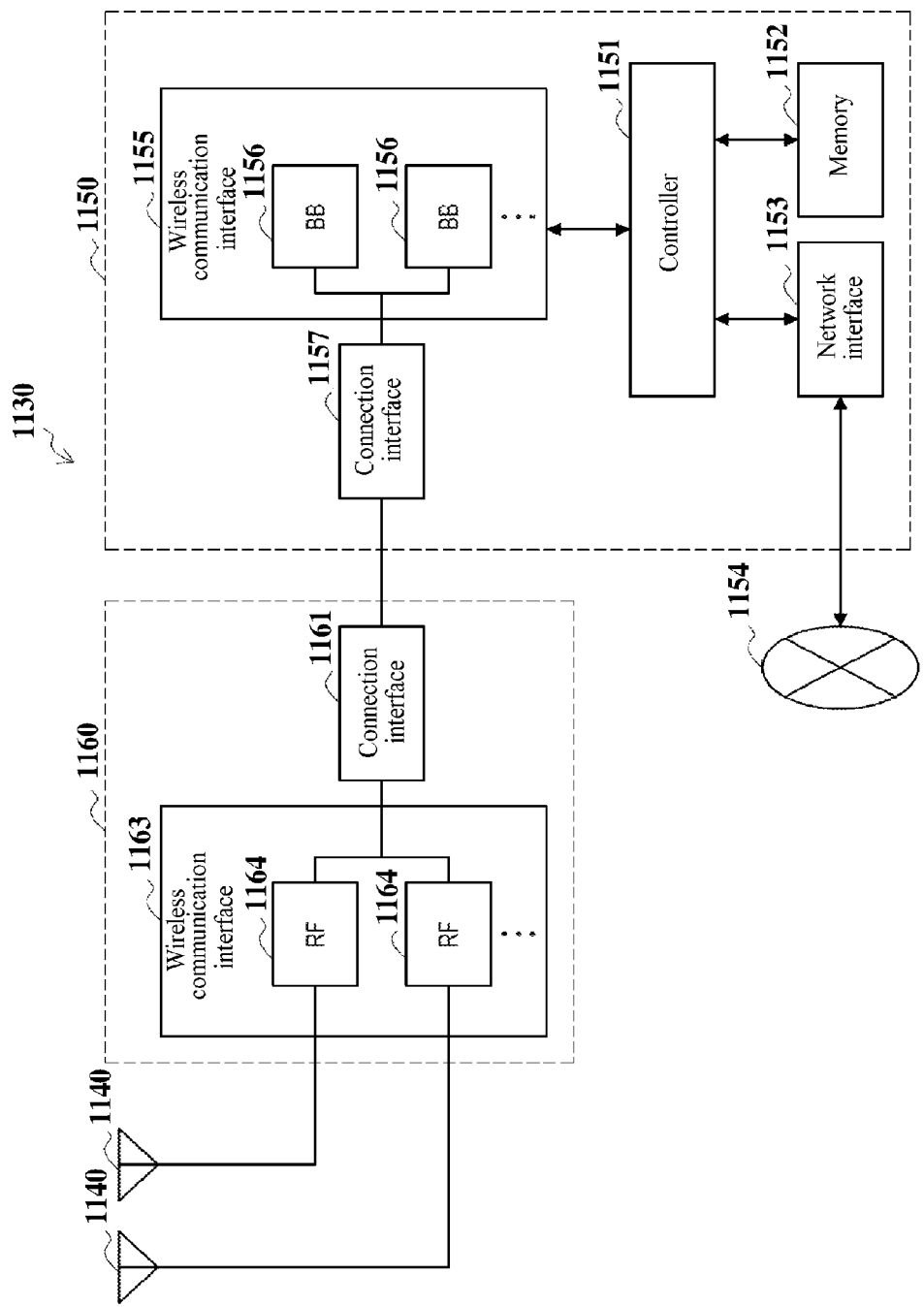
FIG. 11 is a block diagram showing a second example of the schematic configuration adapting to the eNB according to the present disclosure.

FIG. 11 is a block diagram showing a second example of the schematic configuration of the eNB to which the technology of the present disclosure may be applied. An eNB 1130 includes one or more antennas 1140, a base station device 1150 and an RRH 1160. The RRH 1160 and each antenna 1140 may be connected to each other via an RF cable. The base station device 1150 and the RRH 1160 may be connected to each other via a high speed line such as an optical fiber cable.

Each of the antennas 1140 includes a single or multiple antenna elements (such as multiple antenna elements included in the MIMO antenna) and is used for the RRH 1160 to transmit and receive a wireless signal. As shown in FIG. 11, the eNB 1130 may include multiple antennas 1140. For example, the multiple antennas 1140 may be compatible with multiple frequency bands used by the eNB 1130. Although FIG. 11 shows an example in which the eNB 1130 includes multiple antennas 1140, the eNB 1130 may include a single antenna 1140.

The base station device 1150 includes a controller 1151, a memory 1152, a network interface 1153, a wireless communication interface 1155 and a connection interface 1157. The controller 1151, the memory 1152 and the network interface 1153 are the same as the controller 1021, the memory 1022 and the network interface 1023 described with reference to FIG. 10.

A wireless communication interface 1155 supports any cellular communication scheme (such as LTE and LTE-advanced), and provide wireless communication with a terminal in a sector corresponding to the RRH 1160 via the RRH 1160 and the antenna 1140. The wireless communication interface 1155 may generally include a BB processor 1156 for example. In addition to that the BB processor 1156 is connected to an RF circuit 1164 of the RRH 1160 via the connection interface 1157, the BB processor 1156 is the same as the BB processor 1026 described with reference to FIG. 10. As shown in FIG. 11, the wireless communication interface 1155 may include multiple BB processors 1156. For example, the multiple BB processors 1156 may be compatible with multiple frequency bands used by the eNB 1130. Although FIG. 11 shows an example in which the wireless communication interface 1155 includes multiple BB processors 1156, the wireless communication interface 1155 may include a single BB processor 1156.

The connection interface 1157 is an interface configured to connect the base station device 1150 (the wireless communication interface 1155) to the RRH 1160. The connection interface 1157 may be a communication module for communication in the high speed line described above which connects the base station device 1150 (the wireless communication interface 1155) to the RRH 1160.

The RRH 1160 includes a connection interface 1161 and a wireless communication interface 1163.

The connection interface 1161 is an interface configured to connect the RRH 1160 (the wireless communication interface 1163) to the base station device 1150. The connection interface 1161 may be a communication module for performing communication via the high speed line described above.

The wireless communication interface 1163 transmits and receives a wireless signal via the antenna 1140. The wireless communication interface 1163 may generally include an RF circuit 1164 for example. The RF circuit 1164 may include for example a mixer, a filter and an amplifier, and transmits and receives a wireless signal via the antenna 1140. As shown in FIG. 11, the wireless communication interface 1163 may include multiple RF circuits 1164. For example, the multiple RF circuits 1164 may support multiple antenna elements. Although FIG. 11 shows an example in which the wireless communication interface 1163 includes multiple RF circuits 1164, the wireless communication interface 1163 may include a single RF circuit 1164.

In the eNB 1000 and the eNB 1130 shown in FIG. 10 and FIG. 11, the processing circuit 410 described with reference to FIG. 4 and the generation unit 411, the configuration unit 412 and the selection unit 413 in the processing circuit 410 may be implemented by the controller 1021 and/or the controller 1151, and the communication unit 420 described with reference to FIG. 4 may be implemented by the wireless communication interface 1025 and the wireless communication interface 1155 and/or the wireless communication interface 1163. At least a part of the functions may be implemented by the controller 1021 and the controller 1151. For example, the controller 1021 and/or the controller 1151 may perform the function of generating the measurement indication, the function of configuring CSI-RS resources and the function of selecting the antenna port by executing instructions stored in the corresponding memory.

Figure 12:
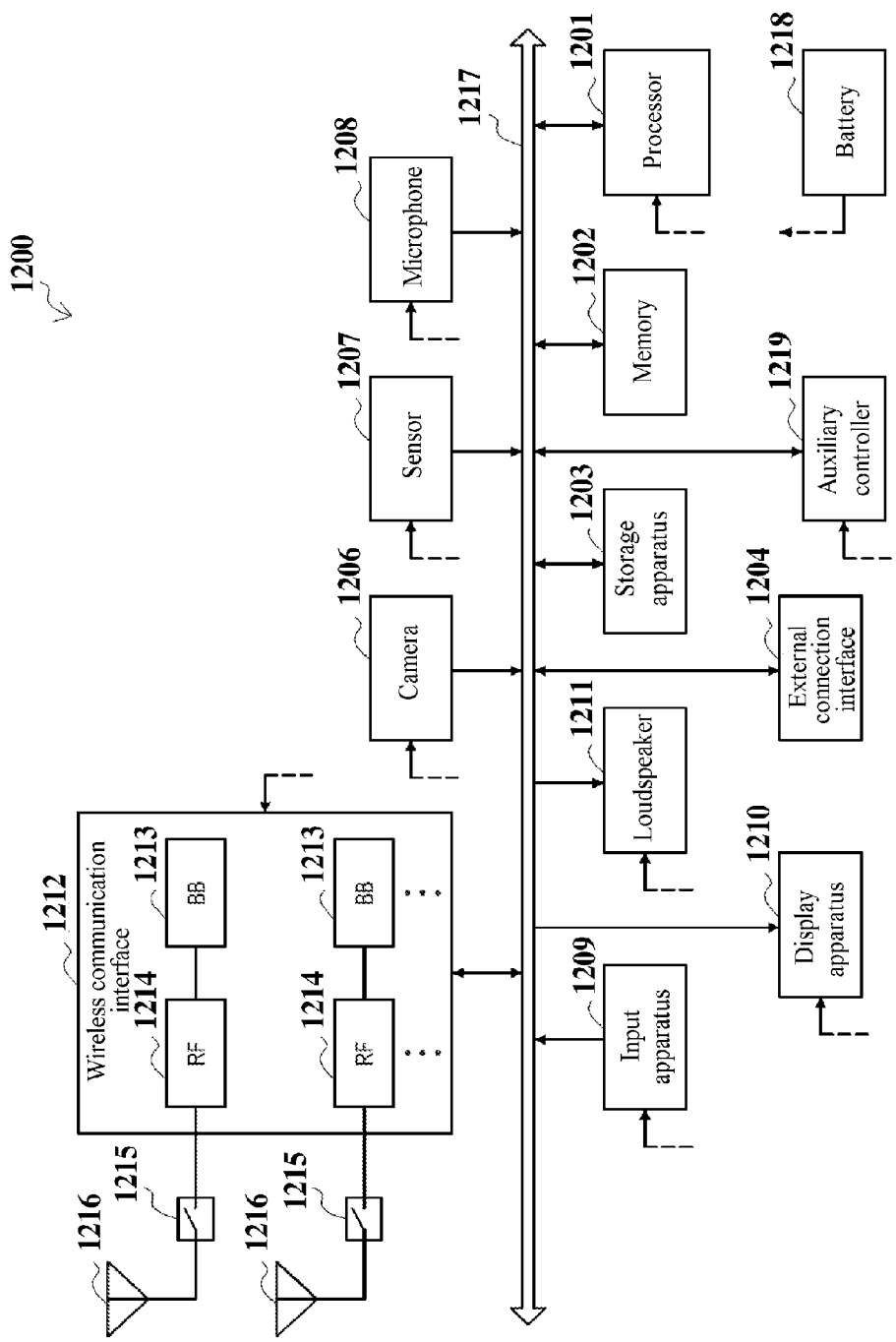
FIG. 12 is a block diagram showing an example of a schematic configuration adapting to a smart phone according to the present disclosure.

FIG. 12 is a block diagram showing an example of a schematic configuration of a smart phone 1200 to which the technology of the present disclosure may be applied. The smart phone 1200 includes: a processor 1201, a memory 1202, a storage apparatus 1203, an external connection interface 1204, a camera 1206, a sensor 1207, a microphone 1208, an input apparatus 1209, a display apparatus 1210, a loudspeaker 1211, a wireless communication interface 1212, one or more antenna switches 1215, one or more antennas 1216, a bus 1217, a battery 1218 and an auxiliary controller 1219.

The processor 1201 may be for example a CPU or a system on chip (SoC), and control functions of an application layer and other layers of the smart phone 1200. The memory 1202 includes an RAM and an ROM, and stores programs executed by the processor 1201 and data. The storage apparatus 1203 may include a storage medium, such as a semiconductor memory and a hard disk. The external connection interface 1204 is an interface configured to connect an external apparatus (such as a memory card and a universal serial bus (USB) device) to the smart phone 1200.

The camera 1206 includes an image sensor (such as a charge coupled device (CCD) and a complementary metal oxide semiconductor (CMOS)) and generates a captured image. The sensor 1207 may include a set of sensors, such as a measurement sensor, a gyroscope sensor, a geomagnetic sensor and an acceleration sensor. The microphone 1208 converts sound inputted into the smart phone 1200 into an audio signal. The input apparatus 1209 includes for example a touch sensor configured to detect touch on a screen of the display apparatus 1210, a keypad, a keyboard, a button or a switch, and receives an operation or information inputted from a user. The display apparatus 1210 includes a screen (such as a liquid crystal display (LCD) and an organic light emitting diode (OLED) display), and displays an output image of the smart phone 1200. The loudspeaker 1211 converts the audio signal outputted from the smart phone 1200 into sound.

The wireless communication interface 1212 supports any cellular communication scheme (such as LTE and LTE-advanced), and performs wireless communication. The wireless communication interface 1212 may generally include for example a BB processor 1213 and an RF circuit 1214. The BB processor 1213 may perform encoding/decoding, modulating/demodulating and multiplexing/de-multiplexing for example, and perform various types of signal processing for wireless communication. Meanwhile, the RF circuit 1214 may include for example a mixer, a filter and an amplifier, and transmits and receives a wireless signal via an antenna 1216. The wireless communication interface 1212 may be a chip module on which a BB processor 1213 and the RF circuit 1214 are integrated. As shown in FIG. 12, the wireless communication interface 1212 may include multiple BB processors 1213 and multiple RF circuits 1214. Although FIG. 12 shows an example in which the wireless communication interface 1212 includes multiple BB processors 1213 and multiple RF circuits 1214, the wireless communication interface 1212 may include a single BB processor 1213 or a single RF circuit 1214.

In addition to the cellular communication scheme, the wireless communication interface 1212 may support other types of wireless communication schemes, such as a short distance wireless communication scheme, a near field communication scheme and a wireless local area network (LAN) scheme. In this case, the wireless communication interface 1212 may include a BB processor 1213 and an RF circuit 1214 for each type of wireless communication scheme.

Each of the wireless switches 1215 switches a connection destination of the antenna 1216 between multiple circuits (for example circuits for different wireless communication schemes) included in the wireless communication interface 1212.

Each of the antennas 1216 includes a single or multiple antenna elements (such as multiple antenna elements included in the MIMO antenna), and is used for the wireless communication interface 1212 to transmit and receive a wireless signal. As shown in FIG. 12, the smart phone 1200 may include multiple antennas 1216. Although FIG. 12 shows an example in which the smart phone 1200 includes multiple antennas 1216, the smart phone 1200 may include a single antenna 1216.

In addition, the smart phone 1200 may include an antenna 1216 for each type of wireless communication scheme. In this case, the antenna switch 1215 may be omitted from the configuration of the smart phone 1200.

The bus 1217 connects the processor 1201, the memory 1202, the storage apparatus 1203, the external connection interface 1204, the camera 1206, the sensor 1207, the microphone 1208, the input apparatus 1209, the display apparatus 1210, the loudspeaker 1211, the wireless communication interface 1212 and the auxiliary controller 1219 with each other. The battery 1218 supplies power for blocks in the smart phone 1200 shown in FIG. 12 via a feeder which is indicated partially as a dashed line in the figure. The auxiliary controller 1219 controls a minimum necessary function of the smart phone 1200 in a sleeping mode, for example.

In the smart phone 1200 shown in FIG. 12, the processing circuit 210 described with reference to FIG. 2 and the measurement unit 211 and the generation unit 212 included in the processing circuit 210, and the processing circuit 210 described with reference to FIG. 3 and the measurement unit 211, the generation unit 212, the comparison unit 213 and the determination unit 214 included in the processing circuit 210, may be implemented by the processor 1201 or the auxiliary controller 1219. In addition, the communication unit 220 described with reference to FIG. 2 and the communication unit 220 described with reference to FIG. 3 may be implemented by the wireless communication interface 1212. At least a part of the functions may be implemented by the processor 1201 or the auxiliary controller 1219. For example, the processor 1201 or the auxiliary controller 1219 may perform the function of measuring CSI-RSs and the function of generating feedback information by executing instructions stored in the memory 1202 or the storage apparatus 1203.

Figure 13:
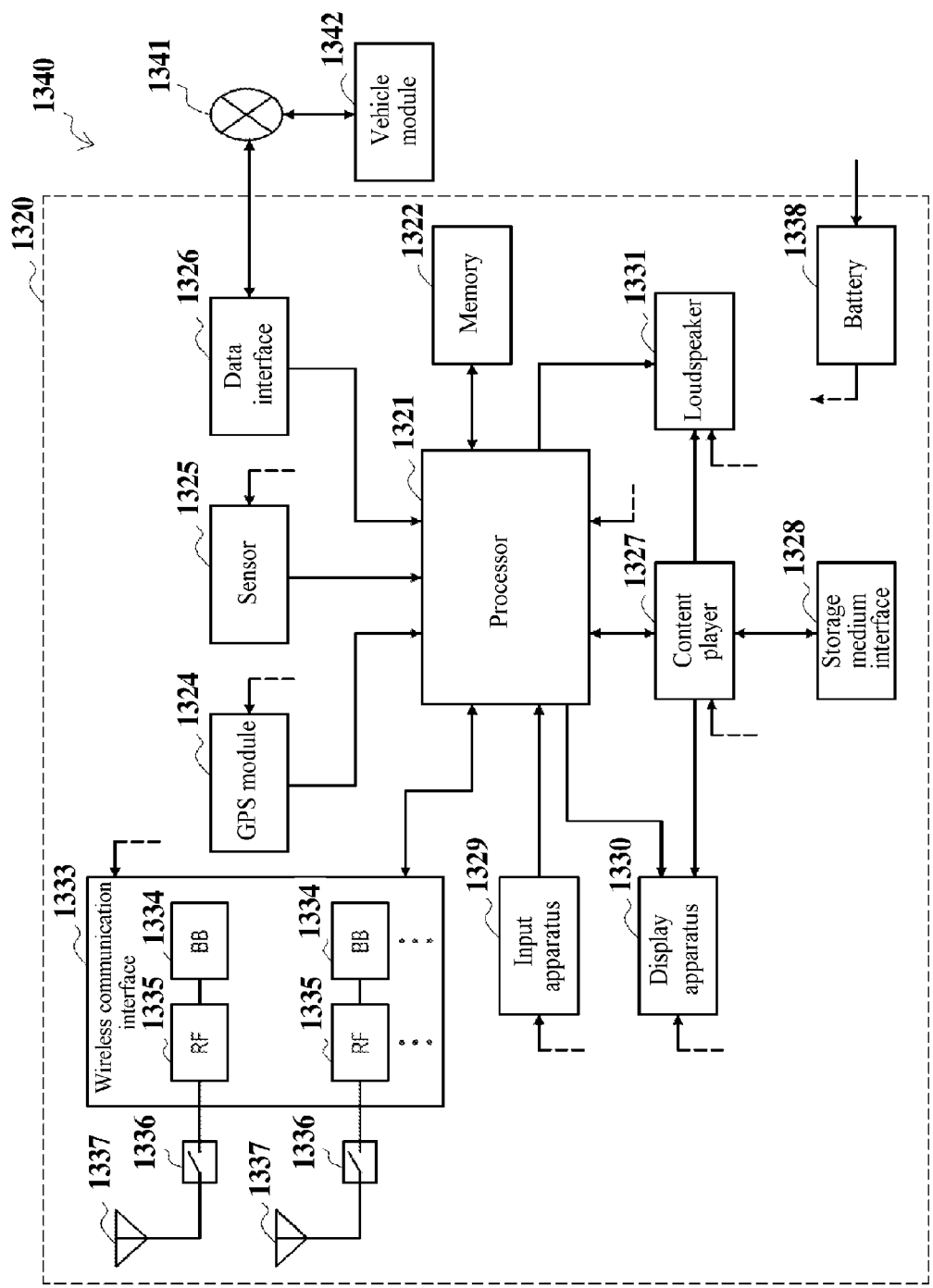
FIG. 13 is a block diagram showing an example of a schematic configuration adapting to an automobile navigation device according to the present disclosure.

FIG. 13 is a block diagram showing an example of a schematic configuration of an automobile navigation device 1320 to which the technology of the present disclosure may be applied. The automobile navigation device 1320 includes a processor 1321, a memory 1322, a global positioning system (GPS) module 1324, a sensor 1325, a data interface 1326, a content player 1327, a storage medium interface 1328, an input apparatus 1329, a display apparatus 1330, a loudspeaker 1331, a wireless communication interface 1333, one or more antenna switches 1336, one or more antennas 1337 and a battery 1338.

The processor 1321 may be a CPU or an SoC, and controls a navigation function and other functions of the automobile navigation device 1320. The memory 1322 includes an RAM and an ROM, and stores programs executed by the processor 1321 and data.

The GPS module 1324 measures a position of the automobile navigation device 1320 (such as a latitude, a longitude and a height) by using a GPS signal received from a GPS satellite. The sensor 1325 may include a set of sensors, such as a gyroscope sensor, a geomagnetic sensor and an air pressure sensor. The data interface 1326 is connected to a vehicle network 1341 for example through a terminal not shown, and acquires data generated by the vehicle (such as vehicle speed data).

The content player 1327 reproduces contents stored in a storage medium (such as a CD and a DVD), and the storage medium is inserted into the storage medium interface 1328.

The input apparatus 1329 includes for example a touch sensor configured to detect touch on a screen of the display apparatus 1330, a button or a switch, and receives an operation or information inputted from a user. The display apparatus 1330 includes a screen of an LCD or OLED display for example, and displays an image with a navigation function or the reproduced content. The loudspeaker 1331 outputs a sound with a navigation function or the reproduced content.

The wireless communication interface 1333 supports any cellular communication scheme (such as LTE and LTE-advanced), and performs wireless communication. The wireless communication interface 1333 may generally include a BB processor 1334 and an RF circuit 1335 for example. The BB processor 1334 may perform encoding/decoding, modulating/demodulating and multiplexing/de-multiplexing, and perform various types of signal processing for wireless communication. Meanwhile, the RF circuit 1335 may include for example a mixer, a filter and an amplifier, and transmits and receives a wireless signal via the antenna 1337. The wireless communication interface 1333 may also be a chip module on which the BB processor 1334 and the RF circuit 1335 are integrated. As shown in FIG. 13, the wireless communication interface 1333 may include multiple BB processors 1334 and multiple RF circuits 1335. Although FIG. 13 shows an example in which the wireless communication interface 1333 includes multiple BB processors 1334 and multiple RF circuits 1335, the wireless communication interface 1333 may include a single BB processor 1334 or a single RF circuit 1335.

In addition to the cellular communication scheme, the wireless communication interface 1333 may support other types of wireless communication schemes, such as a short distance wireless communication scheme, a near field communication scheme and a wireless LAN scheme. In this case, for each type of wireless communication scheme, the wireless communication interface 1333 may include the BB processor 1334 and the RF circuit 1335.

Each of the antenna switches 1336 switches a connection destination of the antenna 1337 between multiple circuits (such as circuits for different wireless communication schemes) included in the wireless communication interface 1333.

Each of the antennas 1337 includes a single or multiple antenna elements (such as multiple antenna elements included in the MIMO antenna), and is used for the wireless communication interface 1333 to transmit and receive a wireless signal. As shown in FIG. 13, the automobile navigation device 1320 may include multiple antennas 1337. Although FIG. 13 shows an example in which the automobile navigation device 1320 includes multiple antennas 1337, the automobile navigation device 1320 may include a single antenna 1337.

In addition, the automobile navigation device 1320 may include the antenna 1337 for each type of wireless communication scheme. In this case, the antenna switch 1336 may be omitted from the configuration of the automobile navigation device 1320.

The battery 1338 supplies power for blocks in the automobile navigation device 1320 shown in FIG. 13 via a feeder which is indicated partially as a dashed line in the figure. The battery 1338 accumulates power provided by the vehicle.

In the automobile navigation device 1320 shown in FIG. 13, the processing circuit 210 described with reference to FIG. 2 and the measurement unit 211 and the generation unit 212 included in the processing circuit 210, and the processing circuit 210 described with reference to FIG. 3 and the measurement unit 211, the generation unit 212, the comparison unit 213 and the determination unit 214 included in the processing circuit 210, may be implemented by the processor 1321. In addition, the communication unit 220 described with reference to FIG. 2 and the communication unit 220 described with reference to FIG. 3 may be implemented by the wireless communication interface 1333. At least a part of the functions may be implemented by the processor 1321. For example, the processor 1321 may perform the function of measuring CSI-RSs and the function of generating feedback information by executing instructions stored in the memory 1322.

The technology of the present disclosure may be implemented as a vehicle-mounted system (or a vehicle) 1340 including one or more of the automobile navigation device 1320, the vehicle network 1341 and a vehicle module 1342. The vehicle module 1342 generates vehicle data (such as a vehicle speed, an engine speed and fault information), and outputs the generated data to the vehicle network 1341.

In the system and method according to the present disclosure, obviously, components or steps may be decomposed and/or recombined. The decomposition and/or recombination should be regarded as equivalent solutions of the present disclosure. In addition, steps in the series of processing described above may be performed naturally in an order of description and in a time order, and is not necessarily performed in the time order. Some steps may be performed in parallel or independently from each other.

Although the embodiments of the present disclosure are described in detail in conjunction with the drawings above, it should be understood that the embodiments described above are only used to illustrate the present disclosure and are not intended to limit the present disclosure. For those skilled in the art, various types of changes and modifications may be made to the embodiments without departing from the essence and scope of the present disclosure. Therefore, the scope of the present disclosure is defined by only the appended claims and equivalent meaning thereof.

The invention claimed is:

1. An electronic device in a wireless communication system, comprising:
one or more processing circuits configured to perform operations of:
determining measurement indication from a base station in the wireless communication system, the measurement indication including a first measurement indication and a second measurement indication which is different from the first measurement indication, the first measurement indication being used for measuring channel state information reference signals (CSI-RSs) on all of multiple antenna ports of a neighboring cell, and the second measurement indication being used for measuring CSI-RSs on selected antenna ports of the neighboring cell;
measuring CSI-RSs on all of multiple antenna ports of the neighboring cell, respectively, in response to the first measurement indication from the base station in the wireless communication system, the base station configuring zero power CSI-RS resources for one or more antenna ports of a current cell in case of the first measurement indication;
comparing measurement results of the CSI-RSs on the multiple antenna ports with multiple thresholds, by comparing measurement results of the CSI-RSs on the multiple antenna ports with corresponding threshold of the multiple thresholds, respectively;

determining occupation information based on a comparison result;

generating feedback information based on the measurement results, the feedback information being used at the base station to select an antenna port for transmitting CSI-RSs to the electronic device from the one or more antenna ports and to reconfigure non-zero power CSI-RS resources for the selected antenna port, the feedback information including the occupation information indicating an occupation condition of each of the multiple antenna ports; and measuring CSI-RSs on the selected antenna ports of the neighboring cell, in response to the second measurement indication from the base station in the wireless communication system, the base station configuring non-zero power CSI-RS resources for one or more antenna ports of a current cell in case of the second measurement indication.

2. The electronic device according to claim 1, wherein the number of the or more antenna ports is n, where n is a natural number, and wherein the occupation information comprises a bitmap having n bits, and each bit corresponds to one antenna port of the multiple antenna ports.

3. The electronic device according to claim 1, wherein the CSI-RSs are transmitted and beam-formed only through a part of antenna ports.

4. The electronic device according to claim 1, wherein the measurement indication is comprised in radio resource control (RRC) signaling.

5. The electronic device according to claim 1, wherein the parameters obtained by performing measurement on the CSI-RSs by the processing circuit comprise at least one of reference signal receiving power (RSRP), reference signal receiving quality (RSRQ), receiving signal strength indication (RSSI) and channel quality indication (CQI).

6. The electronic device according to claim 1, wherein the wireless communication system is an advanced long-term evolution (LTE-A) cellular communication system, and the electronic device is a user equipment in the wireless communication system.

7. An electronic device in a wireless communication system, comprising:

one or more processing circuits configured to perform operations of:

generating measurement indication, the measurement indication including a first measurement indication and a second measurement indication which is different from the first measurement indication, the first measurement indication being used at a user equipment in the wireless communication system for measuring channel state information reference signals (CSI-RSs) on all of multiple antenna ports of a neighboring cell, and the second measurement indication being used at the user equipment in the wireless communication system for measuring CSI-RSs on selected antenna ports of the neighboring cell;

configuring zero power CSI-RS resources for one or more antenna ports of a current cell, in case of transmitting the first measurement indication to the user equipment;

selecting an antenna port for transmitting CSI-RSs to the user equipment from the multiple antenna ports based on feedback information from the user equipment, the feedback information comprising occupation information indicating an occupation condition of each of the multiple antenna ports, the occupation information being determined based on a comparison result of comparing measurement results of the CSI-RSs on the multiple antenna ports with multiple thresholds, by comparing measurement results of the CSI-RSs on the multiple antenna ports with corresponding threshold of the multiple thresholds, respectively; and reconfiguring non-zero power CSI-RS resources for the selected antenna port;

wherein a first antenna port of the multiple antenna ports for transmitting the CSI-RSs is determined as occupied, when a value of parameters obtained by performing measurement on the CSI-RSs on the first antenna port is greater than a first threshold of the multiple thresholds, the first threshold corresponding to the first antenna port, wherein the one or more processing circuits is configured to perform configuring non-zero power CSI-RS resources for one or more antenna ports of the current cell in case of transmitting the second measurement indication to the user equipment.

8. The electronic device according to claim 7, wherein the number of the one or more antenna ports is n, where n is a natural number, and wherein the occupation information comprises a bitmap having n bits, and each bit corresponds to one antenna port of the multiple antenna ports.

9. The electronic device according to claim 7, wherein the CSI-RSs are transmitted and beam-formed only through a part of antenna ports.

10. The electronic device according to claim 7, wherein the processing circuit comprises the measurement indication in radio resource control (RRC) signaling.

11. The electronic device according to claim 7, wherein the processing circuit generates the measurement indication to instruct the user equipment to measure CSI-RSs on all antenna ports of the neighboring cells, and wherein the processing circuit configures the zero-power CSI-RS resource for all antenna ports of the current cell where the user equipment is located.

12. The electronic device according to claim 11, wherein the processing circuit is further configured to perform operations of:

reconfiguring the non-zero-power CSI-RS resource for the selected antenna port for transmitting the CSI-RSs to the user equipment.

13. The electronic device according to claim 7, wherein the measurement indication occupies 1 bit.

14. The electronic device according to claim 7, wherein the electronic device is a base station, and further comprises a transceiver configured to communicate with the user equipment.

15. A method for performing wireless communication in a wireless communication system, comprising:

determining measurement indication from a base station in the wireless communication system, the measurement indication including a first measurement indication and a second measurement indication which is different from the first measurement indication, the first measurement indication being used for measuring channel state information reference signals (CSI-RSs) on all of multiple antenna ports of a neighboring cell, and the second measurement indication being used for measuring CSI-RSs on selected antenna ports of the neighboring cell;

measuring, by a user equipment in the wireless communication system, CSI-RSs on all of multiple antenna ports of the neighboring cell, respectively, in response to the first measurement indication from the base station in the wireless communication system, the base station configuring zero power CSI-RS resources for one or more antenna ports of a current cell in case of the first measurement indication;
comparing measurement results of the CSI-RSs on the multiple antenna ports with multiple thresholds by the user equipment, by comparing measurement results of the CSI-RSs on the multiple antenna ports with corresponding threshold of the multiple thresholds, respectively;
determining occupation information based on a comparison result by the user equipment; and
generating feedback information based on the measurement results, the feedback information being used at the base station to select an antenna port for transmitting CSI-RSs to the electronic device from the multiple antenna ports and to reconfigure non-zero power CSI-RS resources for the selected antenna port, the feedback information including the occupation information indicating an occupation condition of each of the multiple antenna ports; and
measuring CSI-RSs on the selected antenna ports of the neighboring cell, in response to the second measurement indication from the base station in the wireless communication system, the base station configuring non-zero power CSI-RS resources for one or more antenna ports of a current cell in case of the second measurement indication.

16. A method for performing wireless communication in a wireless communication system, comprising:
generating measurement indication, the measurement indication including a first measurement indication and a second measurement indication which is different from the first measurement indication, the first measurement indication being used at a user equipment in the wireless communication system for measuring channel state information reference signals (CSI-RSs) on all of multiple antenna ports of a neighboring cell, and the second measurement indication being used at the user equipment in the wireless communication system for measuring CSI-RSs on selected antenna ports of the neighboring cell;
configuring zero power CSI-RS resources for one or more antenna ports of a current cell, in case of transmitting the first measurement indication to the user equipment;
selecting an antenna port for transmitting CSI-RSs to the user equipment from the multiple antenna ports based on feedback information from the user equipment, the feedback information comprising occupation information indicating an occupation condition of each of the multiple antenna ports, the occupation information being determined based on a comparison result of comparing measurement results of the CSI-RSs on the multiple antenna ports with multiple thresholds, by comparing measurement results of the CSI-RSs on the multiple antenna ports with corresponding threshold of the multiple thresholds, respectively; and
reconfiguring non-zero power CSI-RS resources for the selected antenna port;
wherein a first antenna port of the multiple antenna ports for transmitting the CSI-RSs is determined as occupied, when a value of parameters obtained by performing measurement on the CSI-RSs on the first antenna port is greater than a first threshold of the multiple thresholds, the first threshold corresponding to the first antenna port,
wherein, configuring non-zero power CSI-RS resources for one or more antenna ports of the current cell in case of transmitting the second measurement indication to the user equipment.

* * * * *